(12) United States Patent
Mahoney et al.

(10) Patent No.: US 7,718,219 B2
(45) Date of Patent: May 18, 2010

(54) METHOD FOR FORMING CHANNEL PATTERNS WITH CHROMONIC MATERIALS

(75) Inventors: Wayne S. Mahoney, St. Paul, MN (US); Wendy L. Thompson, Roseville, MN (US); Donald J. McClure, Siren, WI (US); Matthew S. Stay, St. Paul, MN (US); Hassan Sahouani, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 432 days.

(21) Appl. No.: 11/769,013

(22) Filed: Jun. 27, 2007

(65) Prior Publication Data

US 2009/0004436 A1    Jan. 1, 2009

(51) Int. Cl.
 *B32B 3/30* (2006.01)
 *B05D 3/02* (2006.01)
 *B05D 1/12* (2006.01)

(52) U.S. Cl. .................. 427/180; 428/156; 428/141; 428/144; 428/145; 428/304.4; 428/308.4; 428/323; 428/688; 524/100; 977/773; 427/372.2

(58) Field of Classification Search ............... 428/156, 428/141, 144, 145, 304.4, 308.4, 323, 688; 427/180, 372.2; 524/100; 977/773
See application file for complete search history.

(56) References Cited

U.S. PATENT DOCUMENTS

| | | | |
|---|---|---|---|
| 2,801,185 A | 7/1957 | Iler | |
| 4,522,958 A | 6/1985 | Das et al. | |
| 5,037,579 A | 8/1991 | Matchett | |
| 5,639,398 A | 6/1997 | Rhee et al. | |
| 5,753,373 A | 5/1998 | Scholz et al. | |
| 5,948,487 A | 9/1999 | Sahouani et al. | |
| 5,998,487 A | 12/1999 | Brahms et al. | |
| 6,329,058 B1 | 12/2001 | Arney et al. | |
| 6,432,526 B1 | 8/2002 | Arney et al. | |
| 6,488,866 B1 | 12/2002 | Sahouani et al. | |
| 6,524,665 B2 | 2/2003 | Sahouani et al. | |
| 6,586,483 B2 | 7/2003 | Kolb et al. | |
| 6,645,578 B2 | 11/2003 | Sahouani et al. | |
| 6,699,533 B2 | 3/2004 | Sahouani et al. | |
| 7,119,161 B2 | 10/2006 | Lawandy | |

(Continued)

FOREIGN PATENT DOCUMENTS

JP        5715063        9/1982

(Continued)

OTHER PUBLICATIONS

Attwood, T.K., and Lydon, J.E., "Lyotropic Mesophase Formation by Anti-Asthmatic Drugs," *Molecular Crystals and Liquid Crystals*, vol. 108, Issue 1, Aug. 1984, pp. 349-357.

(Continued)

*Primary Examiner*—Ling Xu

(57) ABSTRACT

A method for forming channels within a dried chromonic layer is described. A coating composition is applied to a substrate, dried, and exposed to a hydrophilic organic solvent forming a channel pattern having a first set of channels, and a second set of channels that are substantially perpendicular to the first set of channels. A deposition material may be disposed within the channels to form a nanostructured pattern. An article having a channel pattern is further described.

25 Claims, 3 Drawing Sheets

U.S. PATENT DOCUMENTS

| | | |
|---|---|---|
| 7,294,370 B2 | 11/2007 | Lavrentovich et al. |
| 2002/0150698 A1 | 10/2002 | Kawabata |
| 2004/0058091 A1 | 3/2004 | Dutova et al. |
| 2006/0063015 A1 | 3/2006 | McCormick et al. |
| 2006/0110540 A1 | 5/2006 | Sahouani |
| 2006/0111482 A1 | 5/2006 | Sahouani |

FOREIGN PATENT DOCUMENTS

| | | |
|---|---|---|
| JP | 61111374 | 5/1986 |
| JP | 2002-357718 | 12/2002 |
| WO | WO 2007/008249 A2 | 1/2007 |
| WO | WO 2007/011417 A2 | 1/2007 |

OTHER PUBLICATIONS

Kawasaki, M., et al., "Controlled Layering of Two-Dimensional J-Aggregate of Anionic Cyanine Dye on Self-Assembled Cysteamine Monolayer on Au(111)," *Langmuir*, vol. 16, Issue 12, Jan. 31, 2000, pp. 5409-5417.

Linsenbuhler, M., et al., "An Innovative Dry Powder Coating Process in Non-Polar Liquids Producing Tailor-Made Micro-Particles," *Powder Technology*, vol. 158, Aug. 18, 2005, pp. 3-20.

Lydon, J., "Chromonic Mesophases," *Colloid and Interface Science*, vol. 8, (2004) pp. 480-490.

U.S. Application entitled "Method For Making Nanostructures With Chromonics", filed Jan. 24, 2007, having U.S. Appl. No. 11/606,456.

Bonazzi, S. et al., "Self-Assembly and Liquid Crystal Formation of Folic Acid Salts," *Agnew. Chem. Int. Ed. Eng.*, vol. 32, No. 2, (1993) pp. 248-250.

Ciuchi, F., et al., "Self-Recognition and Self-Assembly of Folic Acid Salts: Columnar Liquid Crystalline Polymorphism and the Colum Growth Process," *Journal of the American Chemical Society*, vol. 116, (1994) pp. 7064-7071.

Gottarelli, G. et al., "The Self-Recognition and Self-Assembly of Folic Acid Salts in Isotropic Water Solution," *Helvetica Chimica Acta*, vol. 79, (1996) pp. 220-234.

Heath, J. et al., "A Defect-Tolerant Computer Architecture: Opportunities for Nanotechnology," *Science*, vol. 280, Jun. 12, 1998, pp. 1716-1721.

Hu, J. et al., "Chemistry and Physics in One Dimension: Synthesis and Properties of Nanowires and Nanotubes," *Accounts of Chemical Research*, vol. 32, No. 5, (1999) pp. 435-445.

Ivanisevic, A. et al., "Dip Pen' Nanolithogrphy on Semiconductor Surfaces," *Journal of the American Chemical Society*, vol. 123, (2001) pp. 7887-7889.

Xia, Y. and Whitesides, G., "Soft Lightography," *Agnew. Chem. Int. Ed. Eng.*, vol. 37, (1998) pp. 550-575.

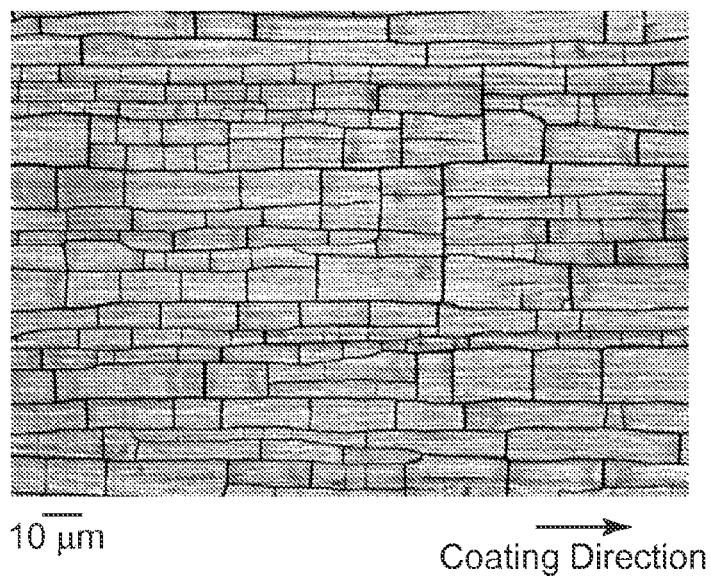
10 μm　　　　　　　Coating Direction
*Fig. 1*
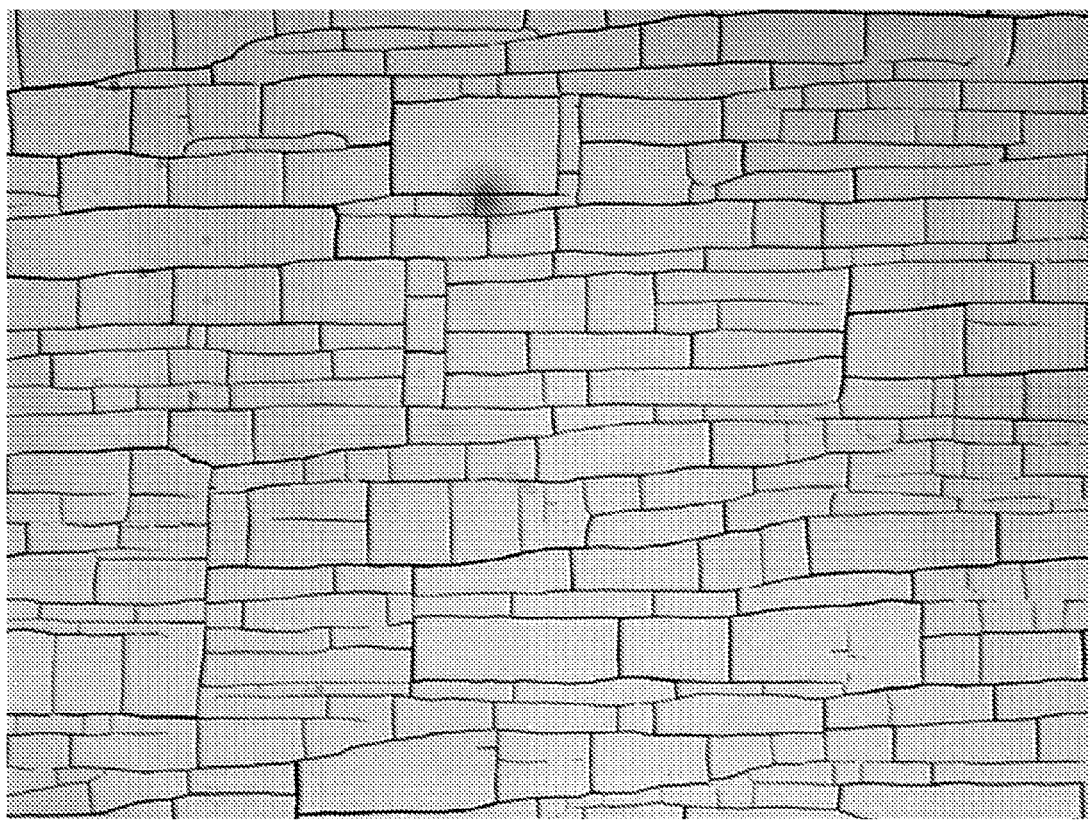
10 μm　　　　*Fig. 2*

10 µm
Coating Direction

METHOD FOR FORMING CHANNEL PATTERNS WITH CHROMONIC MATERIALS

FIELD

The present disclosure relates to methods for forming channel patterns and for disposing material within the channel patterns to form nanostructured patterns, and to an article having channel patterns.

BACKGROUND

Patterned layers of functional materials can be used in electric component manufacture as well as other applications. For example, multiple layers of differing layers of patterned materials may be used in the manufacture of flat panel displays, such as liquid crystal displays. Active matrix liquid crystal displays include a plurality of rows and columns of address lines that cross at an angle to one another, and form a plurality of crossover points. Techniques for applying patterned layers continue to evolve as the need increases for smaller structures in electric components.

Lithographic techniques can be used to generate small structures; however, as the size domain moves into the nanoscale range, significant technical challenges arise that can limit the use of lithographic techniques for nanostructures.

Self-assembly is another method that can be used to construct nanostructures. Molecular self-assembly is referred to as the assembly of molecules without guidance or management from an outside source. Many biological systems use self-assembly to assemble various molecules and structures such as the lipid bilayer membrane in cells.

SUMMARY

The present disclosure describes methods for forming channel patterns from chromonic layers. A method for forming a channel pattern within a dried chromonic layer is described. Deposition material may be disposed within the channel pattern to form a nanostructured pattern. An article is disclosed that has channel patterns comprising a first set of channels and a second set of channels that intersect the first set of channels.

In a first aspect, a method is provided for forming a channel pattern within a dried chromic layer containing chromonic material and surface modified inorganic nanoparticles. The method includes applying a coating composition onto a substrate surface in a coating direction to form a chromonic layer. The coating composition comprises a chromonic material, surface modified inorganic nanoparticles, and water. A portion of the water of the chromonic layer is removed to form a dried chromonic layer. The method further includes exposing the dried chromonic layer to a hydrophilic organic solvent to form a channel pattern within the dried chromonic layer. The channel pattern comprises a first set of channels extending in the coating direction, and a second set of channels that are substantially perpendicular to the first set of channels. The first set of channels and the second set of channels have an average channel depth equal to an average thickness of the dried chromonic layer.

In a second aspect, a method of forming a nanostructured pattern is provided. The method includes applying a coating composition onto a substrate surface in a coating direction to form a chromonic layer. The coating composition comprises a chromonic material, surface modified inorganic nanoparticles, and water. A portion of the water of the chromonic layer is removed to form a dried chromonic layer. The dried chromonic layer is exposed to an hydrophilic organic solvent to form a channel pattern within the dried chromonic layer. The channel pattern comprises a first set of channels extending in the coating direction, and a second set of channels that are substantially perpendicular to the first set of channels. The first set of channels and the second set of channels each have an average channel depth equal to an average thickness of the dried chromonic layer. The method further includes disposing a deposition material on a surface of the dried chromonic layer, and within both the first set of channels and the second set of channels. The deposition material within the first set of channels and the second set of channels contacts the substrate surface. The dried chromonic layer and the deposition material disposed on the surface of the dried chromonic layer are both removed. The deposition material disposed within the first set of channels and the second set of channels adheres to the substrate surface, and is not removed. The remaining deposition material of the first set of channels and the second set of channels forms a nanostructured pattern.

In a third aspect, an article having a channel pattern is provided. A dried chromonic layer is disposed on a substrate surface. The dried chromonic layer comprises a chromonic material and surface modified inorganic nanoparticles. The dried chromonic layer has a channel pattern comprising a first set of channels, and a second set of channels that are substantially perpendicular to the first set of channels. The first set of channels and the second set of channels have an average channel depth equal to an average thickness of the dried chromonic layer.

BRIEF DESCRIPTION OF THE DRAWINGS

FIG. 1 is an optical micrograph (500× magnification) of a dried chromonic layer having a channel pattern of Example 1.

FIG. 2 is an optical micrograph (500× magnification) of a nanostructured pattern of Example 1.

DETAILED DESCRIPTION

Figure 3:
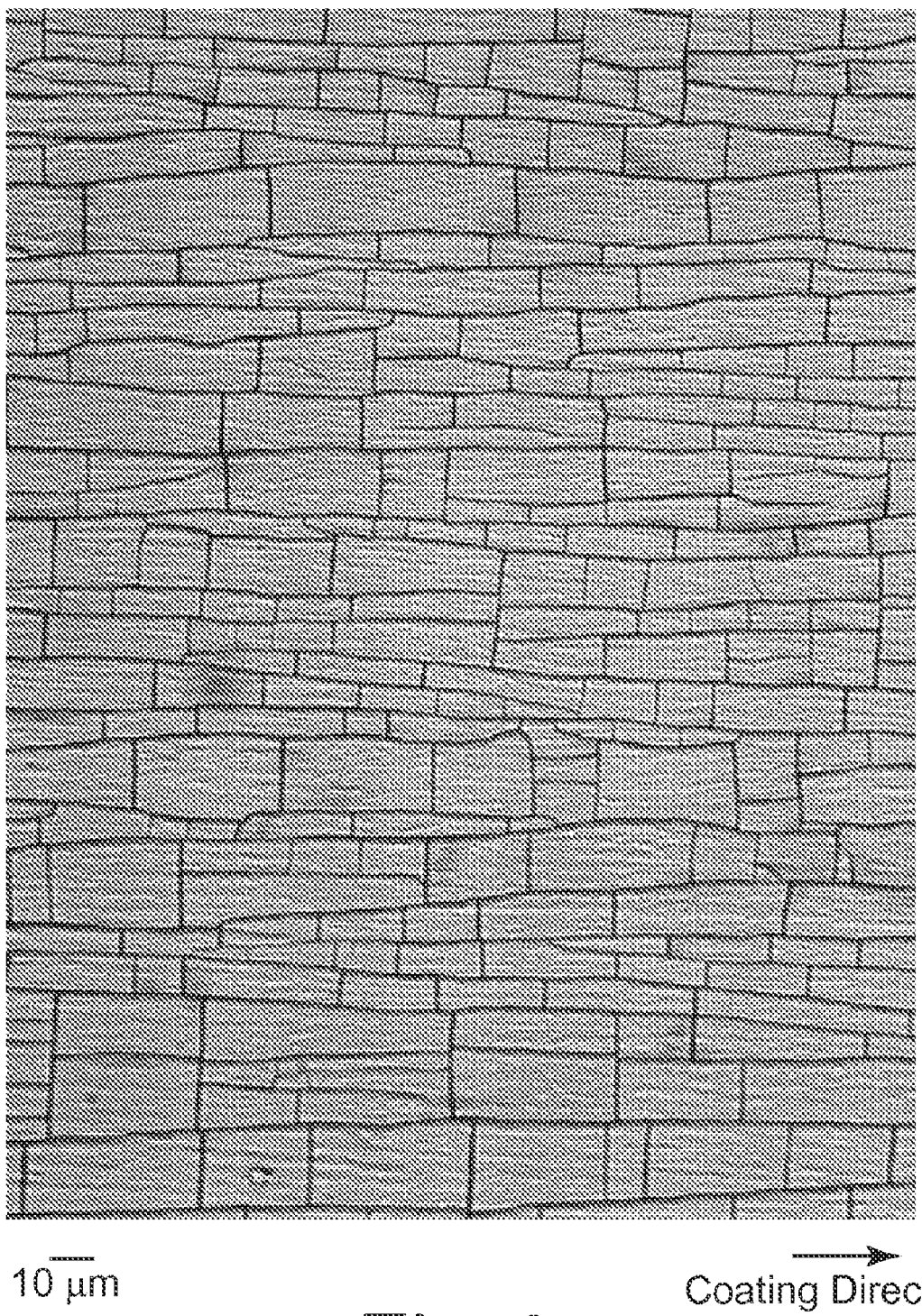
FIG. 3 is an optical micrograph (500× magnification) of a dried chromonic layer having a channel pattern of Example 2.

For the following defined terms, these definitions shall be applied, unless a different definition is given in the claims or elsewhere in the specification.

The term "chromonic material" or "chromonic compound" refers to a multi-ring molecule typically characterized by the presence of a hydrophobic core surrounded by various hydrophilic groups as described, for example, in Attwood, T. K., and Lydon, T. E.; *Molec. Crystals. Liq. Crystals,* 108, 349 (1984). The hydrophobic core can contain aromatic rings, non-aromatic rings, or combinations thereof. When in solution, the chromonic materials tend to aggregate into a nematic ordering characterized by a long-range order.

The term "nanostructure" refers to a structure having a height and a width that is generally less than 1 micron.

The term "nanoparticle" will generally refer to particles, groups of particles, particulate molecules (i.e., small individual groups of loosely associated groups of molecules) and groups of particulate molecules that while potentially varied in specific geometric shape have an effective, or average, diameter that can be measured on a nanoscale.

The term "surface modified inorganic nanoparticle" refers to an inorganic particle that includes surface groups attached to the surface of the particle.

The term "substantially perpendicular" refers to an orthogonal or nearly orthogonal line no greater than 20 degrees, no greater than 15 degrees, no greater than 10 degrees, no greater than 5 degrees, no greater than 4 degrees, no greater than 2 degrees, no greater than 1 degree from a perpendicular direction of 90 degrees. For example, a "substantially perpendicular" line may be in the range of 80 to 100 degrees, 82 to 98 degrees, 85 to 95 degrees, 88 to 92 degrees, or 89 to 91 degrees relative to a reference line.

The recitation of numerical ranges by endpoints includes all numbers subsumed within that range (e.g., 1 to 5 includes 1, 1.5, 2, 2.75, 3, 3.8, 4, and 5).

As included in this specification and the appended claims, the singular forms "a", "an", and "the" include plural referents unless the content clearly dictates otherwise. Thus, for example, reference to a composition containing "a compound" includes a mixture of two or more compounds. As used in this specification and appended claims, the term "or" is generally employed in its sense including "and/or" unless the content clearly dictates otherwise.

Unless otherwise indicated, all numbers expressing quantities or ingredients, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present disclosure. At the very least, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains errors necessarily resulting from the standard deviations found in their respective testing measurements.

The present disclosure describes a method for forming a channel pattern within a dried chromonic layer. The method comprises applying a coating composition comprising a chromonic material, surface modified inorganic nanoparticles, and water to form a chromonic layer on a substrate surface. The coating composition is applied onto a substrate surface in a coating direction. The chromonic layer can be at least partially dried resulting in a dried chromonic layer having chromonic material and surface modified inorganic nanoparticles. The dried chromonic layer may be exposed to a hydrophilic organic solvent to form a channel pattern. The channel pattern comprises a first set of channels in the coating direction and a second set of channels that are substantially perpendicular to the first set of channels. The channels (i.e., recessed regions) have recessed surfaces or sidewalls extending substantially perpendicular to the substrate surface, and the substrate surface as the bottom of the channel. The recessed surfaces or sidewalls comprise chromonic material and surface modified inorganic nanoparticles. The first set of channels and the second set of channels have an average channel depth equal to an average thickness of the dried chromonic layer.

Chromonic materials or molecules are capable of forming a chromonic phase or assembly when dissolved in an aqueous solution, which may or may not be alkaline. The molecules have a hydrophobic core surrounded by hydrophilic groups. Chromonic phases or assemblies often contain stacks of flat, multi-ring aromatic molecules. Molecular stacking takes on a number of morphologies, but is typically characterized by a tendency to form columns created by a stack of molecular layers. Ordered stacks of molecules are formed that grow with increasing concentration, but they are distinct from micellar phases, in that they generally do not have surfactant-like properties and do not exhibit a critical micellar concentration. In some embodiments, the chromonic phases will exhibit isodesmic behavior. That is, addition of molecules to an ordered stack leads to a monotonic decrease in free energy. The chromonic M phase (i.e., hexagonal phase) is generally characterized by ordered stacks of molecules arranged in a hexagonal lattice. The chromonic N phase (i.e., nematic phase) is characterized by a nematic array of columns. There is long range ordering along the columns characteristic of a nematic phase, but little or no ordering amongst the columns, thus being less ordered than the M phase. The chromonic N phase generally exhibits a schlieren texture, which is characterized by regions of varying index of refraction in a transparent medium.

Some compounds that form chromonic phases include, for example, dyes (e.g., azo dyes and cyanine dyes) and perylenes (e.g., Kawasaki et al., *Langmuir*, 16, 5409 (2000), or Lydon, J., *Colloid and Interface Science*, 8, 480 (2004)). Representative examples of useful chromonic materials include di-palladium and mono-palladium organyls, sulfamoyl-substituted copper phthalocyanines, and hexaaryltryphenylene.

Another chromonic molecule can be a non-polymeric molecule comprising more than one carboxyl functional group that can associate with mono-valent or multi-valent cations. The carboxyl groups may be directly attached to an aromatic (e.g., carboxyphenyl) or heteroaromatic functional group. When the chromonic molecule has more than one aromatic or heteroaromatic functional group, the carboxyl groups may be arranged such that each aromatic or heteroaromatic group generally has no more than one carboxyl group directly attached.

In other embodiments, the chromonic molecule may contain at least one formal positive charge. For example, the chromonic molecule may be zwitterionic, with at least one formal positive, and at least one formal negative charge. In some chromonic molecules, the negative charge can be carried by an acidic group having a dissociated hydrogen atom such as a carboxyl group in its basic form, (i.e., —COO$^-$). The negative charge can be carried by multiple carboxyl functional groups present, such that a proper representation of the chromonic molecule has two or more resonance structures, or structural isomers.

In further embodiments, chromonic molecules may include triazine derivatives with the structure shown in Formula I.

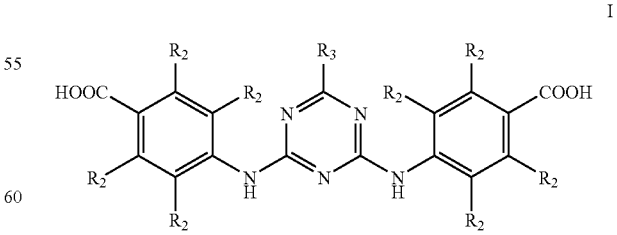

I

The compounds of Formula I have an orientation such that the carboxyl (—COOH) group may be para with respect to the amino linkage to the triazine center of the compound. Although the chromonic molecule is neutral as depicted in Formula I, it may exist in alternative forms, such as a zwitterion or as a proton tautomer. For example, a hydrogen atom can be dissociated from one of the carboxyl groups, and can be associated with one of the nitrogen atoms in the triazine ring or with one of the amino linkages. Further, the chromonic molecule may also be a salt. The carboxyl group may also be meta with respect to the amino linkage, as shown in Formula II, or it may be a combination of para and meta orientations.

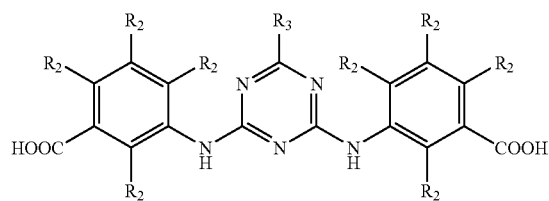

II

Each $R_2$ of Formulas I and II may be independently selected from any electron donating group, electron withdrawing group, electron neutral group, or combinations thereof. In some embodiments, $R_2$ may be hydrogen, a substituted or unsubstituted alkyl group, a substituted or unsubstituted alkoxy group (i.e., an alkoxy group having a formula —OR where R is an alkyl), a substituted or unsubstituted carboxyalkyl group (i.e., a carboxyalkyl group having a formula —(CO)OR where (CO) denotes a carbonyl and R is an alkyl), or combinations thereof. Suitable substituents include hydroxyl, alkoxy, carboxyalkyl, sulfonate, halide functional groups, or combinations thereof. In one embodiment, $R_2$ may be hydrogen.

Group $R_3$ of Formulas I and II may be selected from a substituted heteroaromatic ring, unsubstituted heteroaromatic ring, a substituted heterocyclic ring, or an unsubstituted heterocyclic ring that is linked to the triazine group through a nitrogen atom within the ring of $R_3$. As used herein, the term heterocyclic refers to as an hydrophilic organic compound having a ring structure that includes a heteroatom such as oxygen, nitrogen, sulfur, wherein the ring structure can be saturated or partially saturated. As used herein, the term "heteroaromatic refers to an organic compound having a ring structure that includes a heteroatom such as oxygen, nitrogen, or sulfur, wherein the ring structure is unsaturated.

$R_3$ can be, but is not limited to, a heteroaromatic ring derived from pyridine, pyridazine, pyrimidine, pyrazine, imidazole, oxazole, isoxazole, thiazole, oxadiazole, thiadiazole, pyrazole, triazole, triazine, quinoline, or isoquinoline. In many embodiments, $R_3$ includes a heteroaromatic ring derived from pyridine or imidazole. A substituent for the heteroaromatic ring $R_3$ may be selected from, but is not limited to, any of the following substituted and unsubstituted groups: alkyl, carboxyl, amino, alkoxy, thio, cyano, carbonylaminoalkyl (i.e., a group having a formula —(CO)NHR where (CO) denotes a carbonyl and R is an alkyl), sulfonate, hydroxy, halide, perfluoroalkyl, aryl, alkoxy, or carboxyalkyl. In some embodiments, a substituent for $R_3$ may be selected from alkyl, sulfonate, carboxyl, halide, perfluoroalkyl, aryl, alkoxy, or alkyl substituted with hydroxyl, sulfonate, carboxyl, halide, perfluoroalkyl, aryl, or alkoxy.

In some embodiments, $R_3$ may be derived from a substituted pyridine with the substituent being preferably located at the 4-position. In other embodiments, $R_3$ may be derived from a substituted imidazole with the substituent being preferably located at the 3-position. Suitable examples of $R_3$ may include, but are not limited to: 4-(dimethylamino)pyridinium-1-yl, 3-methylimidazolium-1-yl, 4-(pyrrolidin-1-yl)pyridinium-1-yl, 4-isopropylpyridinium-1-yl, 4-[(2-hydroxyethyl)methylamino]pyridinium-1-yl, 4-(3-hydroxypropyl)pyridinium-1-yl, 4-methylpyridinium-1-yl, quinolinium-1-yl, 4-tert-butylpyridinium-1-yl, and 4-(2-sulfoethyl)pyridinium-1-yl, as illustrated in Formulas IV to XIII below. Examples of heterocyclic rings that $R_3$ may be selected from include, for example, morpholine, pyrrolidine, piperidine, or piperazine.

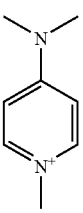

IV

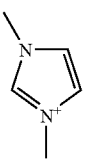

V

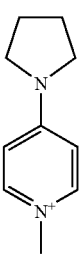

VI

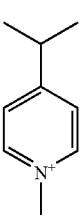

VII

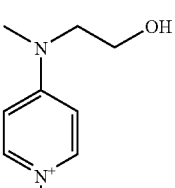

VIII

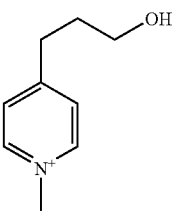

IX

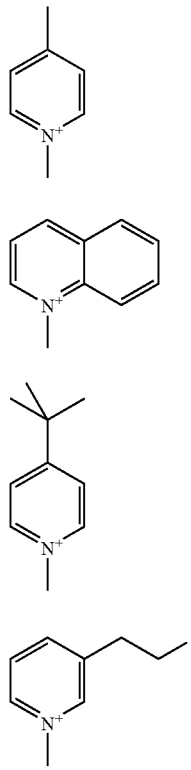

Some exemplary R₃ groups are of Formula XIV,

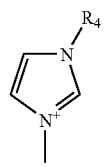

where R₄ of Formula XIV may be hydrogen, a substituted alkyl group, or an unsubstituted alkyl group. In some embodiments, R₄ may be hydrogen, an unsubstituted alkyl group, or an alkyl group substituted with a hydroxy, an alkoxy, a carboxyalkyl, a sulfonate, or a halide functional group. In other embodiments, R₄ may be methyl, propylsulfonic acid, or oleyl (i.e., fatty alcohol). Formula V may be a subset of Formula XIV where R₄ is methyl. As depicted above, the chromonic molecules of Formula I or II are neutral; however, chromonic molecules described herein may exist in an ionic form having one formal positive charge. One example of a chromonic molecule is 4-dimethylamino-1-[4,6-di(4-carboxyphenylamino)-1,3,5-triazin-2-yl]pyridinium chloride (Formula III) as described in U.S. Pat. No. 6,488,866. In the chromonic compound shown in Formula III, R₃ is a dimethylamino substituted pyridine ring linked to the triazine group through the nitrogen atom of the pyridine ring. As shown, the pyridine nitrogen carries a positive charge, and a chloride ion carries a negative charge.

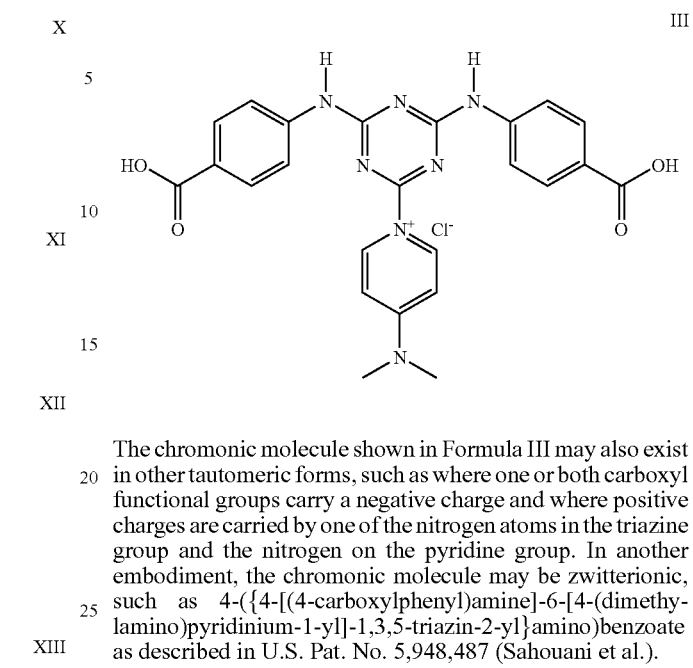

The chromonic molecule shown in Formula III may also exist in other tautomeric forms, such as where one or both carboxyl functional groups carry a negative charge and where positive charges are carried by one of the nitrogen atoms in the triazine group and the nitrogen on the pyridine group. In another embodiment, the chromonic molecule may be zwitterionic, such as 4-({4-[(4-carboxylphenyl)amine]-6-[4-(dimethylamino)pyridinium-1-yl]-1,3,5-triazin-2-yl}amino)benzoate as described in U.S. Pat. No. 5,948,487 (Sahouani et al.).

U.S. Pat. No. 5,948,487 (Sahouani et al.) describes triazine derivatives of Formula I prepared as aqueous solutions or as salts, which can later be re-dissolved to form an aqueous solution. A typical synthetic route for the triazine molecules shown in Formula I above involves a two-step process. Cyanuric chloride may be treated with 4-aminobenzoic acid to give 4-{[4-(4-carboxyamino)-6-chloro-1,3,5-triazin-2-yl]amino}benzoic acid. This intermediate may be treated with a substituted or unsubstituted nitrogen-containing heterocycle. The nitrogen atom of the heterocycle may displace the chlorine atom on the triazine to form a corresponding chloride salt. The zwitterionic derivative of Formula III may be prepared by dissolving the chloride salt in ammonium hydroxide, passing it through an anion exchange column to replace the chloride with hydroxide, and removing the solvent. Alternative structures, as in Formula II, may be obtained by using 3-aminobenzoic acid instead of 4-aminobenzoic acid.

Surface modified inorganic nanoparticles are physically or chemically modified to provide properties that are different from unmodified inorganic nanoparticles. Many suitable classes of surface-modifying agents for modifying an inorganic nanoparticle surface are known to those skilled in the art, and include silanes, organic acids, organic bases, alcohols, or combinations thereof. The surface groups may be present on the surface of the nanoparticles in an amount sufficient to form inorganic nanoparticles that may be suspended in an aqueous solution with minimal aggregation or agglomeration.

Suitable inorganic nanoparticles may include, for example, calcium phosphate, calcium hydroxyapatite, and metal oxide nanoparticles such as silica, zirconia, titania, ceria, alumina, iron oxide, vanadia, zinc oxide, antimony oxide, tin oxide, nickel oxide, and combinations thereof. The inorganic nanoparticles can be composite materials such as, for example, alumina/silica, iron oxide/titania, titania/zinc oxide, zirconia/silica, and combinations thereof. In one embodiment, the nanoparticles are one of at least silica, zirconia, or titania.

Surface modified inorganic nanoparticles or precursors to them may be in the form of a colloidal dispersion. Some of these dispersions are commercially available as unmodified silica starting materials, for example, such as nano-sized colloidal silicas available under the product designations "NALCO 1040," "NALCO 1050," "NALCO 1060," "NALCO 2326," "NALCO 2327," and "NALCO 2329" from Nalco Chemical Company; Naperville, Ill. One example of a metal oxide colloidal dispersion includes colloidal zirconium oxide, as described, for example, in U.S. Pat. No. 5,037,579 (Matchett). Colloidal titanium oxide, as described, in U.S. Pat. Nos. 6,329,058 and 6,432,526 (Amey et al.) represents another example of a metal oxide colloidal dispersion.

Selected inorganic nanoparticles may be used alone or in combination with one or more other nanoparticles to provide mixtures and combinations of nanoparticles. The selected inorganic nanoparticles in whatever form employed, will generally have an average particle diameter of 500 nanometers or less. In some embodiments, the inorganic nanoparticles may be utilized having an average particle diameter of at least 2, at least 5, at least 10, at least 25, at least 50, or at least 100 nanometers. In further embodiments, the inorganic nanoparticles may have an average particle diameter up to 500, up to 400, up to 250, or up to 150 nanometers. The inorganic nanoparticles may have an average particle diameter in a range of 2 to 500 nanometers, in the range of 5 to 400 nanometers, in the range of 5 to 250 nanometers, or in the range of 10 to 150 nanometers. If the chosen nanoparticles or combinations of nanoparticles are themselves aggregated, the maximum preferred cross-sectional dimension of the aggregated nanoparticles will be within any of the stated ranges.

In some cases, it may be desirable for the inorganic nanoparticles utilized to be substantially spherical in shape. In other applications, however, more elongated shapes may be desired. Aspect ratios of at least 1, at least 2, at least 3, or at least 5 may be utilized. In some embodiments, aspect ratios up to 10, up to 9, up to 8, or up to 7 may be utilized. In other embodiments, the aspect ratio of the inorganic nanoparticles may be in a range of 1 to 10, 2 to 9, 3 to 8, or 3 to 7. As used herein, the term "aspect ratio" refers to the longest length of the particle divided by the distance perpendicular to the longest length.

Inorganic nanoparticles may be selected such that the nanoparticles are essentially free from a degree of particle association, agglomeration, or aggregation that may interfere with the desired properties when mixed with chomonic materials and water of a coating composition. As used herein, particle "association" is defined as a reversible chemical combination due to any of the weaker classes of chemical bonding forces. Examples of particle association include hydrogen bonding, electrostatic attraction, London forces, van der Waals forces, and hydrophobic interactions. As used herein, the term "agglomeration" is defined as a combination of molecules or colloidal particles into clusters. Agglomeration may occur due to the neutralization of the electric charges, and is typically reversible. As used herein, the term "aggregation" is defined as the tendency of large molecules or colloidal particles to combine in clusters or clumps and precipitate or separate from the dissolved state. Aggregated nanoparticles are firmly associated with one another, and require high shear to be broken. Agglomerated and associated nanoparticles can generally be easily separated.

The surface of the selected inorganic nanoparticles can be chemically or physically modified in some manner. Modifications to the inorganic nanoparticle surface may include, for example, covalent chemical bonding, hydrogen bonding, electrostatic attraction, London forces, and hydrophilic or hydrophobic interactions so long as the interaction is maintained at least during a time period sufficient for the nanoparticles to achieve their intended utility. The surface of a nanoparticle may be modified with one or more surface modifying groups. The surface modifying groups may be derived from a myriad of surface modifying agents. Schematically, surface modifying agents may be represented by Formula XV.

$$A-B \quad\quad XV$$

The A group in Formula XV is a group or moiety that is capable of attaching to the surface of an inorganic nanoparticle. In situations where the nanoparticle is processed in solvent, the B group is a compatibilizing group with whatever solvent is used to process the nanoparticles. In some situations where the nanoparticles are not processed in solvent, the B group is a group or moiety that is capable of preventing irreversible agglomeration of the nanoparticles. It is possible for the A and B components to be the same, where the attaching group may also be capable of providing the desired surface compatibility. The compatibilizing group may be reactive, but is generally non-reactive, with the chromonic material. It is understood that the attaching composition may be comprised of more than one component or created in more than one step, for example, the A composition may be comprised of an A' moiety which is reacted with the surface of a nanoparticle, followed by an A" moiety which can then be reacted with B. The sequence of addition is not important, i.e., the A'A"B component reactions can be wholly or partly performed prior to attachment to the nanoparticle. Further description of nanoparticles in coatings can be found in Linsenbuhler, M. et al., *Powder Technology*, 158, 3 (2003).

A variety of methods are available for modifying the surfaces of inorganic nanoparticles. A surface modifying agent may, for example, be added to nanoparticles (e.g., in the form of a powder or a colloidal dispersion) and the surface modifying agent may be allowed to react with the nanoparticles. Multiple synthetic sequences to bring the nanoparticle together with the surface modifying group are possible. Some examples of surface modification processes of nanoparticles are described, for example, in U.S. Pat. No. 2,801,185 (Iler); U.S. Pat. No. 4,522,958 (Das et al.); and U.S. Pat. No. 6,586,483 (Kolb et al.).

In some embodiments, surface-modifying agents may include silanes. Some examples of silanes may include organosilanes such as alkylchlorosilanes; alkoxysilanes (e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, isooctyltrimethoxysilane, phenyltriethoxysilane, polytriethoxysilane, trialkoxyarylsilanes, isooctyltrimethoxysilane); N-(3-triethoxysilylpropyl)methoxyethoxyethoxy ethyl carbamate; N-(3-triethoxysilylpropyl)methoxyethoxyethoxyethyl carbamate; 3-(triethoxysilyl)propylsuccinic anhydride, alkylsilanes (e.g., substituted and unsubstituted alkyl silanes (e.g., methoxy and hydroxy substituted alkyl silanes)), and combinations thereof.

In other examples, a silane has an ionizable group selected from hydroxyl, alkoxy, carboxyl, halogen, —OPO$_3$H$_2$, —PO$_3$H$_2$, thiol, amino, or a salt thereof. The ionizable group can be either in an acid or in salt form (e.g., counterions can include alkali metals, alkyl ammonium, or combinations thereof). In some examples, the silane has at least two ionizable groups. In other examples, the silane with an ionizable group can be of Formula XVI.

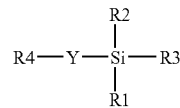

XVI

In Formula XVI, R1 may be hydroxyl, alkoxy, halide, or combinations thereof. Similarly, R2 and R3 may independently be hydroxyl, alkoxy, halide, or combinations thereof.

In some embodiments, R1, R2, and R3 may be the same group. In other embodiments, R1, R2, and R3 independently may be different groups. In another embodiment, two of R1, R2, or R3 may be the same group, and one of R1, R2, or R3 may be a different group. In one embodiment, when R1, R2, and R3 are hydroxyl, the ionizable group may be a salt. Substituent Y can be a divalent group, such as an alkylene, an arylene, an oxyalkylene, or combinations thereof. Y can be attached to both silicon, and to R4. R4 may be an ionizable group, where R4 may be —COOH, —OH, —OR (where R is an alkyl group), —OPO$_3$H$_2$, —PO$_3$H$_2$, —SH, —NH, anhydride, or a salt thereof. Modification of the inorganic nanoparticles with an organosilane having an ionizable group may stabilize the inorganic nanoparticles in water.

In one embodiment, the organosilane of Formula XVI comprises R1, R2, and R3, where each are alkoxy having 1 to 10 carbon atoms. In another embodiment, R1, R2, R3 of Formula XVI is a halide, where the halide is chloride. In a further embodiment, R1, R2, and R3 of Formula XVI are each hydroxyl.

In some embodiments, R1, R2, and R3 of Formula XVI are hydroxyl, where at least one of the hydroxyl groups is an ionizable group. In another embodiment, R1, R2, and R3 of Formula XVI are hydroxyl, and R4 is selected from hydroxyl, or carboxyl.

In one embodiment, an organosilane of Formula XVI, where each of R1, R2, and R3 are hydroxyl, R4 is carboxyl, and Y is ethylene. One of R1, R2, and R3 is an ionizable group. In one embodiment, the organosilane is carboxyethyl silane triol sodium salt.

Rather than using silanes, inorganic nanoparticle surfaces may be modified with organic acid surface-modifying agents which include oxyacids of carbon (e.g., carboxylic acid), sulfur and phosphorus, acid derivatized poly(ethylene) glycols (PEGs) and combinations of any of these. Suitable phosphorus containing acids include phosphonic acids (e.g., octylphosphonic acid, laurylphosphonic acid, decylphosphonic acid, dodecylphosphonic acid, and octadecylphosphonic acid), monopolyethylene glycol phosphonate and phosphates (e.g., lauryl or stearyl phosphate). Suitable sulfur containing acids include sulfates and sulfonic acids including dodecyl sulfate and lauryl sulfonate. Any such acids may be used in either acid or salt forms.

In some embodiments, surface modifying agents incorporate a carboxylic acid functionality such as CH$_3$—O—(CH$_2$CH$_2$O)$_2$CH$_2$COOH, 2-(2-methoxyethoxy)acetic acid having the chemical structure CH$_3$OCH$_2$CH$_2$OCH$_2$COOH, mono(polyethylene glycol) succinate in either acid or salt form, octanoic acid, dodecanoic acid, steric acid, acrylic and oleic acid or their acidic derivatives. In a further embodiment, surface modified iron oxide nanoparticles include those modified with endogenous fatty acids (e.g., stearic acid) or fatty acid derivatives using endogenous compounds (e.g., stearoyl lactylate or sarcosine or taurine derivatives). Further, surface modified zirconia nanoparticles include a combination of oleic acid and acrylic acid adsorbed onto the surface of the particle.

Organic base surface modifying agents for inorganic nanoparticles may include alkylamines (e.g., octylamine, decylamine, dodecylamine, octadecylamine, and monopolyethylene glycol amines).

Surface-modifying alcohols and thiols may also be employed including aliphatic alcohols (e.g., octadecyl, dodecyl, lauryl and furfuryl alcohol), alicyclic alcohols (e.g., cyclohexanol), and aromatic alcohols (e.g., phenol and benzyl alcohol), and combinations thereof.

An amount of a surface modifying agent can be selected to react with the surface of the inorganic nanoparticles. A reaction of the surface modifying agent with the inorganic nanoparticles may be sufficient to provide a stable suspension of surface modified inorganic nanoparticles. The surface modified inorganic nanoparticles in a coating composition can be effective for providing a channel pattern. The amount (e.g., millimoles) of surface modifying agent per gram of dry silica nanoparticles can be at least 0.001 millimoles (mmoles), at least 0.01 mmoles, at least 0.03 mmoles, at least 0.05 mmoles, or at least 0.1 mmoles. The amount of surface modifying agent per gram of dry silica nanoparticles may be in an amount up to 2.5 mmoles, up to 1.5 mmoles, up to 1 mmoles, or up to 0.5 mmoles. In some embodiments, the amount of surface modifying agent per gram of dry silica nanoparticles may be in a range of 0.001 to 2.5 mmoles, 0.01 to 1.5 mmoles, 0.03 to 1 mmoles, or 0.03 to 0.5 mmoles.

The coating composition of this disclosure contains a chromonic material, surface modified inorganic nanoparticles, and water. A pre-coating composition may be formed from components including an aqueous suspension of surface modified inorganic nanoparticles, water, a pH-adjusting compound, and an optional surfactant prior to the addition of the chromonic material. The pre-coating composition may be combined and mechanically agitated in a container. The chromonic material may be subsequently added and dissolved in the pre-coating composition to form the coating composition.

A pre-coating composition may comprise one or more pH-adjusting compounds and an optional surfactant. The addition of a pH-adjusting compound often allows a chromonic material to become more soluble in an aqueous dispersion. Suitable pH-adjusting compounds include any known base such as, for example, sodium hydroxide, potassium hydroxide, lithium hydroxide, ammonium hydroxide (NH$_4$OH), or various amines. The pH of the pre-coating composition may be at least 5, at least 6, at least 7, at least 8, or at least 9. In some embodiments, the pH may be up to 12, up to 11, or up to 10. In some embodiments, the pH may be in a range of 5 to 12, 6 to 11, or 7 to 11. The optional surfactant may be added to the pre-coating composition to promote wetting of the coating composition on the surface of a substrate. Suitable surfactants include ionic surfactants, nonionic surfactants, or combinations thereof. Optional additives such as viscosity modifiers (e.g., polyethylene glycol) or binders (e.g., low molecular weight hydrolyzed starches) can also be added. Some of the optional additives or optional surfactants may be added to the pre-coating composition in an amount of at 0.4, at least 0.5, at least 1, or at least 3 weight percent of the pre-coating composition. In some embodiments, the optional additives or optional surfactants may be added to the pre-coating composition in an amount up to 10, up to 7, or up to 5 weight percent of the pre-coating composition. In other embodiments, the optional additives or optional surfactants may be added to the pre-coating composition in a range of 0.4 to 10 weight percent, 0.5 to 10 weight percent, 1 to 7 weight percent, 3 to 7 weight percent, or 3 to 5 weight percent of the pre-coating composition. One or more organic solvents, in some embodiments, may be added to the pre-coating composition. The organic solvents can be added to the pre-coating composition to achieve an organic solvent concentration of at least 0.1, at least 0.5, at least 1, at least 3, or at least 5 weight percent of the pre-coating composition. The organic solvents can be added to the pre-coating composition to achieve an organic solvent concentration up to 10, up to 9, up to 8, or up to 7 weight percent of the pre-coating composition. Organic solvents can be added to the pre-coating composition to achieve an organic solvent concentration in a range of 0.1 to 10 weight percent, 0.5 to 10 weight percent, 1 to 8 weight percent, or 3 to 7 weight percent of the pre-coating composition.

An aqueous dispersion of surface modified inorganic nanoparticles can be added to the pre-coating composition prior to the addition of a chromonic material. The surface modified inorganic nanoparticles of the pre-coating composition may have a concentration of at least 10, at least 15, or at least 17 weight percent. The surface modified inorganic nanoparticles of the pre-coating composition may have a concentration up to 30, up to 25, or up to 20 weight percent. In some embodiments, the surface modified inorganic nanoparticles may have a concentration in a range of 10 to 30 weight percent, 10 to 25 weight percent, 15 to 25 weight percent, or 17 to 20 weight percent of the pre-coating composition.

Chromonic materials can be added as a component to the pre-coating composition at room temperature or at a temperature less than approximately 40° C. to dissolve the chromonic material for forming a coating composition. The relative concentrations of each of the components of the coating composition may vary with the desired orientation of the resulting nanostructured patterns and their intended application. In general, however, the chromonic material may be added to the pre-coating composition to achieve a concentration of at least 3, at least 4, at least 5, or at least 7 weight percent of the coating composition. The chromonic material may be added to the pre-coating composition to achieve a concentration up to 20, up to 15, or up to 10 weight percent of the coating composition. In some embodiments, the chromonic material may be added to the pre-coating composition to a achieve a concentration in a range of 3 to 20 weight percent, 4 to 20 weight percent, 5 to 15 weight percent, 7 to 15 weight percent, or 4 to 10 weight percent of the coating composition.

A coating composition may be mixed with a non-chromonic phase including an organic water soluble molecule that forms a homogenous phase with the chromonic material. In some embodiments, the organic water-soluble molecule is a saccharide such as a monosaccharide, disaccharide, trisaccharide, or polysaccharide. For example, the organic water soluble molecule may include polysaccharides such as starch, corn starch, amylopectin, maltodextrins, or corn syrup solids. Alternatively, the organic water soluble molecule can include a monosaccharide such as glucose or fructose, and disaccharides such as sucrose, maltose, or lactose. The organic water soluble molecule can be present in any useful amount. The organic water soluble molecule may be present in the coating composition to achieve a concentration of at least 1, at least 5, at least 10, at least 15, or at least 25 weight percent of the coating composition. In some embodiments, the organic water soluble molecule may be present in the coating composition to achieve a concentration up to 50, up to 40, up to 35, or up to 30 weight percent of the coating composition. The organic water soluble molecule may be present in the coating composition to achieve a concentration in a range of 1 to 50 weight percent, 1 to 40 weight percent, 5 to 35 weight percent, or 10 to 30 weight percent of the coating composition.

The coating composition can be applied to or coated onto a substrate surface. Suitable substrates include any solid material that will accept the application of the coating composition such as flexible polymer films (e.g., poly(ethylene terephthalate), polyimide, polyolefins, or cellulose acetate), rigid substrates (e.g., polycarbonate, glass or silicon wafers), metallic films (e.g., aluminum or nickel foil), surface reactive films, or combinations thereof.

The substrates may be treated with a primer to facilitate coating of the coating composition. The primer can also improve wetting of the substrate for receiving the coating composition or to improve the adhesion of the coating composition to the substrate. In one embodiment, inorganic layers may be applied or formed using techniques such as sputtering (e.g., cathode or planar magnetron sputtering), evaporation (e.g., resistive or electron beam evaporation), chemical vapor deposition, plating, plasma treatment (e.g., corona treatment or oxygen glow discharge), or combinations thereof. Suitable primers include, for example, an inorganic oxide coating as described in U.S. Pat. No. 5,753,373 (Scholz et al.). Suitable materials as inorganic layers may further include glass or inorganic oxides, for example, oxides of silicon (e.g., silicon oxide, silicon dioxide), aluminum oxide, silicon aluminum oxide, or combinations thereof. Inorganic materials as primer layers are described in U.S. Patent Application Publication No. 2006/0063015.

The coating composition can be applied by any useful means that provides for the ordered arrangement of chromonic materials and surface modified inorganic nanoparticles within the chromonic layer. Suitable coating techniques include, for example, roll coating, die coating, dip coating, spray coating, knife coating, or curtain coating. In some embodiments, shear orientation can be applied to the chromonic layer either during or after application to the surface of the substrate. The application of shear force to the chromonic layer can help promote alignment of the chromonic materials such that, upon removal of at least a portion of the water, the dried chromonic layer has an oriented structure or matrix. The surface modified inorganic nanoparticles of the coating composition may also provide defects in the alignment of the chromonic material in the coating direction. The defect may result in the formation of channels extending in a substantially perpendicular direction relative to the coating direction. In one embodiment, the alignment of the chromonic materials with the surface modified inorganic nanoparticles may be in both 1) a direction of the applied force during the coating process and 2) a direction substantially perpendicular to the applied force during the coating process.

The coating composition can be applied to a substrate at any useful wet coating thickness. The coating composition may be applied to the substrate at a uniform wet coating thickness of at least 1, at least 3, at least 5, or at least 10 microns. In some embodiments, the coating composition may be applied to the substrate at a uniform wet coating thickness of up to 25, up to 20, up to 15, or up to 12 microns. Generally, the coating composition may be applied to the substrate at a uniform wet coating thickness in a range of 1 to 25 microns, 3 to 20 microns, 5 to 20 microns, 5 to 15 microns, or 5 to 10 microns.

After applying the coating composition to form a chromonic layer on a substrate surface, at least a portion of the water can be removed from the chromonic layer to form a dried chromonic layer. That is, as used herein, the term "dried chromonic layer" refers to a chromonic layer that has been at least partially dried. Drying of the coated chromonic layer can be achieved using any means suitable for drying aqueous coatings. Useful drying methods will not damage the coating or significantly disrupt the orientation of the coated chromonic layer imparted during coating or application. In some embodiments water is removed from the chromonic layer via evaporation with or without the application of heat to the chromonic layer to form a dried chromonic layer. At least 5, at least 25, at least 50, or at least 75 weight percent of the water (based on the total weight of the coating composition)

may be removed from the chromonic layer to form the dried chromonic layer. In some embodiments, up to 95, up to 90, up to 85, or up to 80 weight percent of the water may be removed from the chromonic layer to form the dried chromonic layer. The weight percent of water that may be removed from the chromonic layer to form the dried chromonic layer may be in a range of 5 to 95 weight percent, 25 to 90 weight percent, 25 to 85 weight percent, or 50 to 80 weight percent.

After removal of water from the chromonic layer, a dried chromonic layer may be formed. The average thickness of the dried chromonic layer, in some embodiments, may be at least 500 nanometers, at least 750 nanometers, or at least 1 micron. The average thickness of the dried chromonic layer may be up to 3 microns, up to 2 microns, or up to 1.5 microns. The dried chromonic layer may have an average thickness in a range of 500 nanometers to 3 microns, 500 nanometers to 2 microns, 750 nanometers to 2 microns, or 1 micron to 1.5 microns.

A dried chromonic layer can be exposed to an organic solvent to form a channel pattern. In some embodiments, the organic solvent may not dissolve a chromonic material in the dried chromonic layer. The organic solvent may be a hydrophilic organic solvent. The organic solvent that may be applied to the dried chromonic layer may include alcohols (e.g., ethanol, 1-propanol, 2-propanol, 1-butanol, 2-butanol, or tertiary butanol), ketones (e.g., acetone, methyl ethyl ketone, cyclopentanone, dimethyl carbonate, diethyl carbonate, or cyclohexanone), or combinations thereof. Other useful organic solvents may include nitriles (e.g., acetonitrile), ethers (e.g., tetrahydrofuran, or methyl tertiary butyl ether), or combinations thereof. The hydrophilic organic solvent is often anhydrous such as, for example, an anhydrous alcohol (e.g., anhydrous ethanol).

A method for coating or exposing a hydrophilic organic solvent on a dried chromonic layer may include techniques, for example, die coating, dip coating, spray coating, knife coating, or curtain coating. Another technique for coating the hydrophilic organic solvent on the dried chromonic layer may include simply applying the hydrophilic organic solvent, as a liquid, drop wise onto the dried chromonic layer. With dip coating, the substrate containing the dried chromonic layer can briefly be held in the hydrophilic organic solvent for a period of time of at least 1, at least 2, at least 3, or at least 4 seconds. The substrate containing the dried chromonic layer can briefly be held in the hydrophilic organic solvent for a period of time up to 10, up to 9, up to 7, or up to 5 seconds. The substrate containing the dried chromonic layer may be held in the hydrophilic organic solvent for a period of time in a range of 1 to 10 seconds, 2 to 9 seconds, 3 to 7, or 3 to 5 seconds. The hydrophilic organic solvent as a coating can be applied as a continuous or discontinuous coating layer to the dried chromonic layer to form a corresponding interconnected channel pattern within the dried chromonic layer. A discontinuous organic solvent coating may be applied in any desired pattern using any useful means such as, for example, inkjet coating or flexographic printing.

In some embodiments, heat may be applied to the hydrophilic organic solvent to vaporize the organic solvent. Heat can be applied in any useful manner such as, for example, in an oven or with infrared heaters. Useful heating methods do not destroy the chromonic layer or warp the substrate resulting in a dried chromonic layer.

Exposing the dried chromonic layer to an hydrophilic organic solvent can form a channel pattern. The channel pattern comprises a first set of channels and a second set of channels both within the dried chromonic layer. The first set of channels comprises a plurality of parallel or substantially parallel channels extending in the coating direction, and the second set of channels comprises a plurality of perpendicular or substantially perpendicular channels to the first set of channels. The first set of channels and the second set of channels may often have an average channel width of at least 10, at least 50, at least 100, or at least 250 nanometers. In some embodiments, the first set of channels and the second set of channels of the channel pattern can be formed having an average channel width up to 800, up to 700, up to 600, or up to 500 nanometers. The first set of channels and the second set of channels of the channel pattern can be formed having an average channel width in a range of 10 to 800 nanometers, 10 to 700 nanometers, 50 to 600 nanometers, or 100 to 500 nanometers. In one embodiment, the average channel width of the first set of channels may be generally similar to the average channel width of the second set of channels of the channel pattern.

Exposing the dried chromonic layer to a hydrophilic organic solvent forms a channel pattern comprising a first set of channels and a second set of channels each having an average channel depth equal to an average thickness of the dried chromonic layer. The substrate surface may be exposed as a base for the first set of channels and the second set of channels. The first set of channels and the second set of channels each may be further defined by a chromonic material and surface modified inorganic nanoparticles as the recess surfaces or sidewalls extending perpendicular or substantially perpendicular to the substrate surface. In some embodiments, the average channel depth of the first set of channels and the second set of channels of the channel pattern may be at least 500 nanometers, at least 750 nanometers, or at least 1 micron. The average depth of the channel pattern comprising the first set of channels and the second set of channels can be up to 3 microns, up to 2 microns, or up to 1.5 microns. The average channel depth of the channel pattern formed comprising the first set of channels and the second set of channels may be in a range of 500 nanometers to 3 microns, 500 nanometers to 2 microns, 750 nanometers to 2 microns, or 1 micron to 1.5 microns. In one embodiment, the average channel depth of the first set of channels may be generally similar to the average channel depth of the second set of channels.

Exposing the dried chromonic layer to a hydrophilic organic solvent forms a channel pattern comprising a first set of channels and a second set of channels each independently may have an average period of at least 500 nanometers, at least 750 nanometers, at least 1 micron, or at least 25 microns. In some embodiments, the channel pattern comprising a first set of channels and a second set of channels each independently may have an average period up to 100 microns, up to 75 microns, up to 50 microns, or up to 35 microns. The channel pattern comprising a first set of channels and a second set of channels each independently may have an average period in a range of 500 nanometers to 100 microns, 500 nanometers to 75 microns, 750 nanometers to 50 microns, 750 nanometers to 35 microns, or 1 micron to 35 microns. For example, a first channel and a second channel within the first set of channels may be separated from one another by a distance in a range of 500 nanometers to 100 microns. In one embodiment, the average period for the first set of channels may not be equal to the average period for the second set of channels within the dried chromonic layer. In another embodiment, the average period for the first set of channels is less than the average period for the second set of channels.

In one embodiment, a channel pattern may include a first set of channels having an average channel depth in a range from 500 nanometers to 3 microns, an average channel width in a range from 10 to 800 nanometers, and an average period in a range from 500 nanometers to 1 micron, and a second set of channels having an average channel depth in a range from 500 nanometers to 3 microns, an average channel width in a range from 10 to 800 nanometers, and an average period in a range from 2 microns to 100 microns. Some channel patterns may comprise a first set of channels and a second set of channels wherein each set of channels has an average channel depth in a range from 500 nanometers to 2 microns, an average channel width in a range of 100 to 300 nanometers, and an average period in a range from 750 nanometers to 2 microns.

The channel pattern comprises channels having different lengths extending in a first direction, a coating direction; and a second direction, a direction substantially perpendicular to the coating direction. In one embodiment, the length of the channels of the first set of channels is greater than the length of the channels of the second set of channels. FIG. 1 illustrates a channel pattern having a first set of channels and a second set of channels on a rigid substrate. FIG. 3 illustrates a channel pattern having a first set of channels and a second set of channels on a flexible substrate.

The formation of channel patterns with chromonic molecules and surface modified inorganic nanoparticles having a nanostructured pattern may be accomplished with a single coating. A single coating for forming a channel pattern of this disclosure may be advantageous over a process for applying two separate and independent coatings to form interconnected channels oriented in two directions. Also, the single step application of a chromonic layer on a substrate surface provides a method especially suited for a continuous, roll-to-roll process on a relatively large surface area providing for increased economic value.

In one aspect, a deposition material can be disposed or deposited on a surface of the dried chromonic layer, and within both the first set of channels and the second set of channels of the channel pattern within the dried chromonic layer. The deposition material within the first set of channels and the second set of channels may contact and adhere to the substrate surface. The deposition material is a metal or metal containing material. The deposition material can include, for example, metals, metal oxides, semi-conductors, dielectric materials, or combinations thereof.

A coupling agent known to react with metals or metal salts may be applied to a surface of the dried chromonic layer after the formation of the channel pattern. One example of a coupling agent includes, but is not limited to, a thiol-containing silanol. A deposition material may be applied on to the dried chromonic layer after treatment with the coupling agent.

In some embodiments, a first set of channels and a second set of channels of a channel pattern within a dried chromonic layer can be cleaned before a deposition material is disposed within a channel pattern. The cleaning step can assist in improving adhesion, for example, of the deposition material to the substrate surface within the channel pattern. Any useful cleaning process can be used to clean the first set of channels and the second set of channels within the dried chromonic layer, but does not destroy the chromonic layer or warp the substrate. Some useful cleaning processes include plasma treatment methods such as, for example, reactive ion etching, inductively coupled plasma, and the like.

In one embodiment, a metal material can be disposed within the channel pattern to form a metallic channel pattern. The metal material within the channel pattern forming the metallic channel pattern may be attached to the substrate surface. Exemplary deposition materials include, but are not limited to, metals, metal alloys, metal-containing compounds such as organometallic compounds, salts of metals, oxides of metals, or combinations thereof. The deposition material may include a metal such as, for example, gold, silver, copper, titanium, iron, or platinum. In one embodiment, the metal may be gold. The deposition material can include multiple layers of material such as multiple layers formed by sequentially depositing different deposition materials. In another embodiment, the deposition material has multiple metal layers that can be the same or different. The deposition material may be a gold layer disposed on a titanium layer.

Useful deposition techniques can be used to apply a deposition material. In some embodiments, deposition materials such as metals can be deposited using vapor deposition techniques and the like. In other embodiments, deposition materials can be applied using solution deposition techniques. For example, the deposition material can be combined with a suitable solvent that does not disturb the integrity of the dried chromonic layer (e.g., the solvent does not dissolve the dried chromic layer). The solution may be applied to the dried chromonic layer, and within the channel pattern comprising a first set of channels and a second set of channels within the dried chromonic layer.

Figure 4:
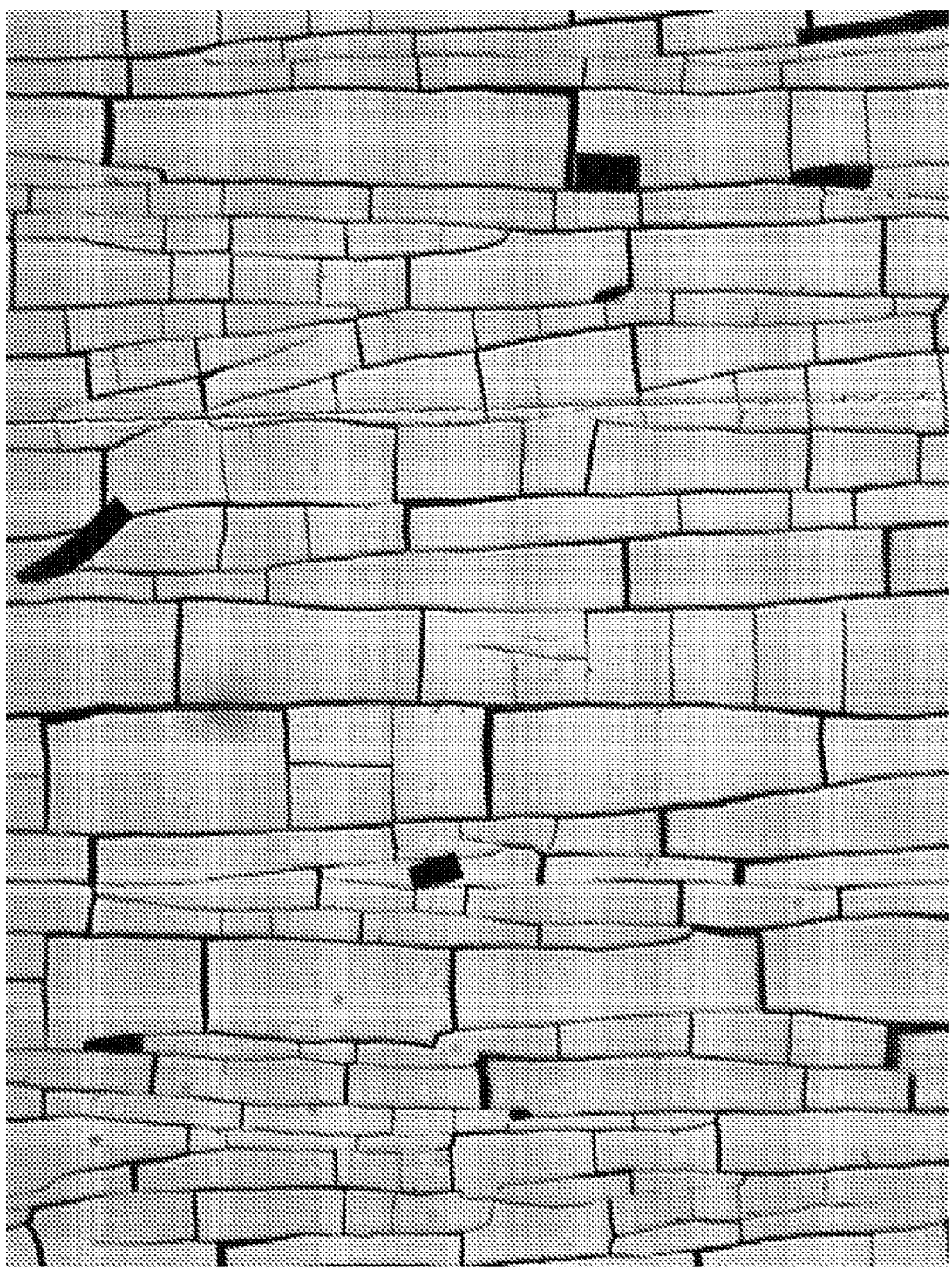
FIG. 4 is an optical micrograph (500× magnification) of a nanostructured pattern of Example 2.

After a deposition material has been disposed on a substrate surface within the channel pattern, and on the surface of a dried chromonic layer, the dried chromonic layer may be removed. The dried chromonic layer, which includes the chromonic material and surface modified inorganic nanoparticles, can be removed from the substrate surface with a solvent that includes water. The deposition material on the surface of the dried chromonic layer that is not within the channel pattern may also be removed. During this step, the deposition material deposited within a first set of channels, and a second set of channels typically remains attached to the substrate surface. The remaining deposition material attached to the substrate surface may result in the formation of a nanostructured pattern. In one embodiment, the nanostructured pattern includes a first set of nanostructures comprising a plurality of parallel or substantially parallel nanostructures, and a second set of nanostructures perpendicular or substantially perpendicular to the first set of nanostructures, where the first and second set of nanostructures are interconnected. In some embodiments, the interconnected nanostructured pattern may conduct electricity. FIG. 2 and FIG. 4 illustrate a nanostructured pattern having a first set of nanostructures and a second set of nanostructures.

Deposition material that remains after removing both a dried chromonic layer and a deposition material disposed on a surface of the dried chromonic layer may form a nanostructured pattern. The nanostructured pattern comprises a first set of nanostructures and a second set of nanostructures each independently having an average nanostructure width of at least 10, at least 25, at least 50, or at least 100 nanometers. In some embodiments, the first set of nanostructures and the second set of nanostructures each independently may have an average nanostructure width up to 800, up to 500, up to 250, or up to 150 nanometers. An average nanostructure width of the first set of nanostructures and the second set of nanostructures each independently may be in a range of 10 to 800 nanometers, 25 to 500 nanometers, 25 to 250 nanometers, or 50 to 150 nanometers.

The deposition material of the nanostructured pattern can have a first set of nanostructures and a second set of nanostructures forming a nanostructured pattern each having an average nanostructure height of at least 10, at least 25, at least 75, or at least 100 nanometers. In some embodiments, the average nanostructure height may be up to 250, up to 200, up to 175, or up to 150 nanometers. The nanostructures may have an average height in a range of 10 to 250 nanometers, 25 to 200 nanometers, 75 to 175, or 75 to 150 nanometers. The average nanostructure height may be a function of the average particle size of the surface modified inorganic nanoparticles of the dried chromonic layer.

In one embodiment, a metal as a deposition material may form metal nanostructures having a first set of nanostructures with a plurality of parallel or substantially parallel metal nanostructures, and a second set of nanostructures having a plurality of perpendicular or substantially perpendicular metal nanostructures to the first set of nanostructures. The nanostructures each independently may have an average period of at least 500 nanometers, at least 750 nanometers, at least 1 micron, or at least 10 microns. The average period of the nanostructures may be up to 100 microns, up to 50 microns, up to 25 microns, or up to 15 microns. The average period of the nanostructure may be in a range of 500 nanometers to 100 microns, 750 nanometers to 50 microns, 1 micron to 50 microns, or 10 microns to 15 microns.

In one embodiment, the first set of nanostructures has an average period less than the average period for the second set of nanostructures.

In some embodiments, the methods described herein can be used to form a nanostructured pattern having a first set of nanostructures, and a second set of nanostructures each having an average nanostructure height in a range from 10 to 250 nanometers, an average nanostructure width in a range from 10 to 800 nanometers, and an average period in a range from 500 nanometers to 20 microns. For example, the first set of nanostructures and the second set of nanostructures can each have an average nanostructure height in a range of 25 to 75 nanometers, an average nanostructure width in a range of 100 to 300 nanometers, and an average period in a range from 2 to 15 microns. The dimensions of the nanostructures as described may provide for an optically transparent substrate capable of conducting electricity. In some embodiments, the interconnected nanostructured patterns have surface conductivity.

More specifically, a substrate having multiple patterns of nanostructures for forming a nanostructured pattern can be prepared in a single coating composition. A coating composition comprising chromonic material, surface modified inorganic nanoparticles, and water can be applied to a substrate surface in a coating direction. After applying the coating composition, a portion of the water may be removed to form a dried chromonic layer. The dried chromonic layer can be exposed to a hydrophilic organic solvent to form a channel pattern. The channel pattern may comprise a first set of channels in the coating direction, and a second set of channels that are substantially perpendicular to the first set of channels. The first set of channels and the second set of channels have an average channel depth equal to an average thickness of the dried chromic layer. A deposition material can then be disposed on the surface of the dried chromonic layer and within both the first set of channels and the second set of channels, where the deposition material of the channels contacts the surface substrate. Further, the dried chromonic layer and the deposition material disposed on the surface of the dried chromonic layer can be removed. The deposition material disposed within the first set of channels and the second set of channels may adhere to the surface of the substrate. The deposition material within the first set of channels and the second set of channels can form a nanostructured pattern. This method further provides for a coating process for forming nanostructures on a relatively large surface area.

In one embodiment, the nanostructured pattern comprises a first set of nanostructures and a second set of nanostructures. The second set of nanostructures is substantially perpendicular to the first set of nanostructures extending in the coating direction.

In one aspect, an article having a nanostructured pattern may be formed. The article comprises a substrate having a substrate surface, and a dried chromonic layer disposed on the substrate surface. The dried chromonic layer may comprise a chromonic material and surface modified nanoparticles. The dried chromonic layer can have a channel pattern comprising a first set of channels in the coating direction and a second set of channels that are substantially perpendicular to the first set of channels. The first set of channels and the second set of channels each have an average channel depth equal to an average thickness of the dried chromonic layer.

In one embodiment, a metal layer may be disposed on a surface of the dried chromonic layer on the substrate surface, and within both the first set of channels and the second set of channels. The metal layer may contact the substrate surface. In some examples of the embodiment, the first set of channels includes a plurality of parallel or substantially parallel channels in a coating direction, and the second set of channels includes a plurality of perpendicular or substantially perpendicular channels to the first set of channels. The metal layer of the first set of channels and the second set of channels contacts the substrate surface.

The nanostructured patterns comprise a first set of nanostructures and a second set of nanostructures substantially perpendicular to the first set of nanostructures, where the nanostructures may be nanowires. The nanowires can represent attractive building blocks for assembly of functional nanoscale devices, and may overcome fundamental and economic limitations of conventional lithography based fabrication. Nanowires could offer potential as building blocks for applications in nanoelectronics and photonics.

The disclosure will be further clarified by the following examples which are exemplary and not intended to limit the scope of the disclosure.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Preparatory Example 1

Surface modified inorganic nanoparticles were formed from the reaction of a silane with silica nanoparticles having an average diameter of 21 nanometers (nm). More specifically, 300 grams of Nalco 2327 colloidal silica from Nalco Chemical Company of Naperville, Ill., was placed in a bottle with a stir bar. While stirring, 28 grams of a 25 weight percent carboxyethyl silane triol sodium salt aqueous solution (Gelest Inc. of Morrisville, Pa.) were added to the colloidal silica over a period of 10 minutes. A small amount of precipitate formed upon the addition of the carboxyethyl silane triol sodium salt, but the precipitate dissolved with additional stirring. The clear dispersion was then placed in a 95° C. oven for 20 hours. The percent solids of the surface modified colloidal silica in water was determined to be 40 weight percent, based on weight loss after drying. The dispersion prior to drying was used in subsequent examples.

Preparatory Example 2

Surface modified inorganic nanoparticles were formed from the reaction of a silane with silica nanoparticles having an average diameter of 142 nanometers (nm). More specifically, 330 grams of Nalco TX13112 colloidal silica (lot #XC5H0836A1) from Nalco Chemical Company of Naperville, Ill., were placed in a bottle with a stir bar. The average diameter of the nanoparticles was measured by the manufacturer using a titration method. While stirring, 4.2 grams of a 25 weight percent carboxyethyl silane triol sodium salt aqueous solution (Gelest Inc. of Morrisville, Pa.) were added to the colloidal silica over a period of 10 minutes. A small amount of precipitate formed upon the addition of the carboxyethyl silane triol sodium salt, but the precipitate dissolved with additional stirring. The clear dispersion was then placed in a 95° C. oven for 20 hours. The percent solids of the surface modified colloidal silica in water was determined to be 37 weight percent, based on weight loss after drying. The dispersion prior to drying was used in subsequent examples.

Preparatory Example 3

Surface modified inorganic nanoparticles were formed from the reaction of a silane with silica nanoparticles having an average diameter of 21 nanometers (nm). More specifically, 300 grams of Nalco 2327 colloidal silica from Nalco Chemical Company of Naperville, Ill., were placed in a bottle with a stir bar. While stirring, 39.4 grams of a 25 weight percent carboxyethyl silane triol sodium salt aqueous solution (Gelest Inc. of Morrisville, Pa.) were added to the colloidal silica over a period of 10 minutes. A small amount of precipitate formed upon the addition of the carboxyethyl silane triol sodium salt, but the precipitate dissolved with additional stirring. The clear dispersion was then placed in a 95° C. oven for 20 hours. The percent solids of the surface modified colloidal silica in water was determined to be 40 weight percent, based on weight loss after drying. The dispersion prior to drying was used in subsequent examples.

Preparatory Example 4

Surface modified inorganic nanoparticles were formed from the reaction of two silanes having different functionalities with silica nanoparticles having an average diameter of 21 nanometers to provide surface modified silica nanoparticles having dual functionality. More specifically, 50 grams of Nalco 2327 colloidal silica (lot BP6H0778A0 from Nalco Chemical Company of Naperville, Ill., were placed in a bottle with a stir bar. While stirring, 6.85 grams of a 25 weight percent carboxyethyl silane triol sodium salt aqueous solution (Gelest Inc. of Morrisville, Pa.) were added to the colloidal silica over a period of 5 to 10 minutes. A small amount of precipitate formed upon the addition of the carboxyethyl silane triol sodium salt, but the precipitate dissolved with additional stirring. Trimethoxypropylsilane, 0.36 grams (lot 90011885) from Alfa Aesar of St. Louis, Mo. were added to the carboxyethyl silane modified inorganic nanoparticle dispersion, and the mixture was stirred for approximately 5 minutes. The clear dispersion was placed in a 90° C. oven for 16 hours. The percent solids of the surface modified colloidal silica in water was determined to be 39.5 weight percent, based on weight loss after drying. The dispersion prior to drying was used in subsequent examples.

Example 1

A mixture comprising 0.26 grams of ICB 3000 corn starch from Tate & Lyle PLC of Decatur, Ill., 3.00 grams of deionized water, 0.13 grams of a 30 weight percent aqueous ammonium hydroxide solution from EMD Chemicals Inc. of Gibbstown, N.J., and 1.0 gram of the surface modified colloidal silica dispersion of Preparatory Example 1 were added to a container with mechanical stirring. After the corn starch was dissolved in the mixture, 0.50 grams of the chromonic material of Formula III, 4-dimethylamino-1-[4,6-di(4-carboxyphenylamino)-1,3,5-triazin-2-yl]pyridinium chloride, prepared as described Example 1 of U.S. Pat. No. 6,488,866, were slowly

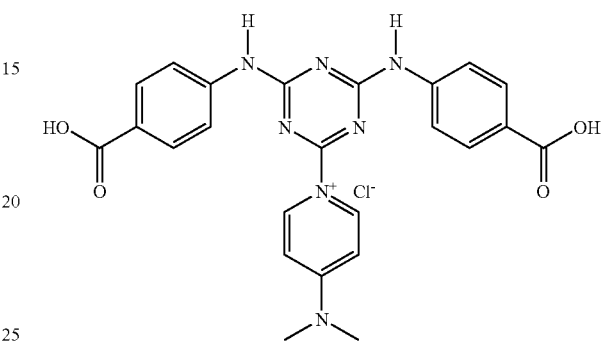

III added to the mixture with stirring. Upon dissolution of the chromonic material, 0.11 grams of a 10 weight percent aqueous solution of an alkyl polyglucoside surfactant (Glucopon 425N) from Cognis Corporation of Cincinnati, Ohio, was added to the mixture with stirring. The resulting mixture was taken up by a disposable syringe fitted with a 1.2 micron disposable syringe filter having a 25 millimeter (mm) diameter (Versapore Membrane #4488, hydrophilic acrylic copolymer on a nonwoven support) from Pall Corporation of East Hills, N.Y., and filtered to form a coating composition.

The coating composition was coated onto a glass slide (Glayerbel Float) from Precision Glass and Optics of Santa Ana, Calif., using a Bird Bar applicator (Part #AR-5518) from Byk-Gardner of Columbia, Md., that had a 12.5 micrometer gap for forming a chromonic layer. The chromonic layer was allowed to air dry at room temperature (approximately 25° C.) for at least 5 minutes forming a dried chromonic layer.

The dried chromonic layer on the slide was exposed by submersing the slide in a narrow, glass chamber having dimensions of 0.7 centimeter (cm)×7.0 cm×7.7 cm. The glass chamber was filled with absolute ethanol (200-proof) from Aaper Alcohol & Chemical Co. of Shelbyville, Ky., for approximately 5 seconds to induce the formation of a channel pattern. The glass slide was then removed from the glass chamber and shaken to remove residual ethanol. The sample was then placed in an oven set at 110° C. for approximately 15 seconds. The sample was then removed from the oven to remove any remaining visible ethanol, and again placed back in the oven set at approximately 110° C. for an additional 15 seconds.

An optical micrograph of FIG. 1 (500× magnification) shows a channel pattern on a slide comprising a first set of channels and a second set of channels within the dried chromonic layer on a glass slide. FIG. 1 shows that under the described conditions, the channel pattern comprises a first set of channels substantially aligned in the coating direction, and a second set of channels that are substantially perpendicular to the first set of channels. The first set of channels comprises a plurality of parallel or substantially parallel channels, where the length of the first set of channels is greater than a length of the second set of channels.

The channel pattern of the dried chromonic layer on a slide was subsequently dry-etched using a YES G1000 Plasma Cleaning System from Yield Engineering Systems Inc. of San Jose, Calif. The electrode configuration used was the "RIE Mode Arrangement" as found in "YES Plasma Cleaning System Manual 610-5237-01," p. 3/12. The slide was placed on the fourth from the top electrode (active). An O2 etch plasma (charged via radio frequency (RF)) was used for 2 minutes. The sample was then placed in a metallization frame face down and held in place with a piece of aluminum foil tape (3M #425, 3M Company, St. Paul Minn. The dried chromonic layer on the slide and the frame were placed in a high-vacuum metallization chamber. Once the chamber reached the appropriate vacuum pressure, 5 nm of titanium was deposited on the surface of the dried chromonic layer, and within both the first set of channels and the second set of channels contacting the substrate (slide) surface via electron-beam induced metal thermal evaporation. Next, 100 nm of gold was deposited on the titanium layer via electron-beam induced metal thermal evaporation to form a bilayer metallic composition.

The slide comprising the metallized sample was next submerged in approximately 300 milliliters (ml) of de-ionized water with several drops of ammonium hydroxide (30 percent w/w) for approximately 2 hours to remove the chromonic material and the surface modified inorganic nanoparticles. The sample was then rinsed with de-ionized water to remove metal not attached to the glass substrate, and further disposed on the surface of the dried chromonic layer. Areas with excessive patches of disposed metal were given a secondary vigorous rinse for several seconds. A nanostructured pattern was formed leaving the disposed metal within the first set of channels and the second set of channels, which adhered to the substrate. The two-dimensional nanostructured pattern or nanogrid comprises metal wires on the glass slide.

An optical micrograph of FIG. 2 (500× magnification) shows a nanostructured pattern of a metal as a deposition material on a glass slide comprising a first set of nanostructures aligned in a coating direction, and a second set of nanostructures substantially perpendicular to the first set of nanostructures. The first set of nanostructures comprises a plurality of parallel or substantially parallel nanostructures, where the length of the first nanostructures are greater than a length of the second set of nanostructures.

An optical micrograph of FIG. 2 shows an interconnected grid of metal wires or nanostructures. Conductivity tests were performed on the metallized sample using a Delcom 717 non-contact eddy current conductance monitor from Delcom Instruments, Inc. of Prescott, Wis. The metallized sample had a measurement of 24.82 mS (milli-Siemens), thus yielding a surface resistance of 40.3 Ω/square (ohm/square).

Visible light transmission was measured on a Hewlett-Packard 8452A Spectrophotometer from Agilent Technologies of Santa Clara, Calif., and found to be 90% of the float glass substrate.

Example 2

A mixture comprising 0.52 grams of corn starch (ICB 3000) from Tate & Lyle PLC of Decatur, Ill., 6.00 grams of deionized water, 0.26 grams of a 30 weight percent aqueous ammonium hydroxide solution from EMD Chemicals Inc. of Gibbstown, N.J., and 2.0 grams of the surface modified colloidal silica dispersion of Preparatory Example 1 were added to a container with mechanical stirring. After the corn starch was dissolved in the mixture, 0.50 grams of the chromonic material of Formula III, 4-dimethylamino-1-[4,6-di(4-carboxyphenylamino)-1,3,5-triazin-2-yl]pyridinium chloride, was slowly added to the mixture with stirring. Upon dissolution of the chromonic material, 0.11 grams of a 10 weight percent aqueous solution of an alkyl polyglucoside surfactant (Glucopon 425N) from Cognis Corporation of Cincinnati, Ohio was added to the mixture with stirring. The resulting mixture was taken up by a disposable syringe fitted with a 1.2 micron disposable syringe filter having a 25 mm diameter (Versapore Membrane #4488; hydrophilic acrylic copolymer on a nonwoven support) from Pall Corporation of East Hills, N.Y., and filtered to form a coating composition.

The coating composition was coated on a poly(ethylene terephthalate) (PET) film from DuPont Teijin Films U.S. Limited Partnership of Hopewell, Va., having a thickness of about 0.125 mm. The PET film was coated with a continuous, sputter-coated, silicon-aluminum-oxide (SiAlOx) layer having a thickness of 5 nm. The SiAlOx layer was DC sputtered from a 95 weight % Si/5 weight % Al sputtering target. Argon was added as the primary sputtering gas at 600 standard cubic centimeters per minute (sccm) to generate a pressure of 6.4 milliTorr (mTorr). Oxygen flow was added and actively controlled to maintain a constant target voltage of 600 volts (V), such that the oxygen flow was approximately 15 sccm. The sputter power was 2.1 kilowatts (kW) applied to a 12.7 cm×38.1 cm target. The PET film was moving at 5.49 meters/minute. The coating composition was applied to the film using a #2.5 wire wound drawdown bar from UV Process Supply of Chicago, Ill. as a chromonic layer. The chromonic layer was allowed to air dry at about 25° C. for approximately 15 minutes.

The dried chromonic layer on the film was exposed by submersing the film in a narrow, glass chamber having dimensions of 0.7 cm×7.0 cm×7.7 cm. The glass chamber was filled with absolute ethanol (200 proof) from Aaper Alcohol & Chemical Co of Shelbyville, Ky., for approximately 5 seconds to induce the formation of a channel pattern. The PET film samples were removed from the glass chamber and shaken to remove residual ethanol. The film was then placed in an preheated oven set at 100° C. for approximately 15 seconds to remove excess ethanol.

An optical micrograph of FIG. 3 (500× magnification) shows a channel pattern on the PET film comprising a first set of channels and a second set of channels within the dried chromonic layer on a flexible substrate. FIG. 3 shows that under the given conditions, the channel pattern comprises a first set of channels substantially aligned in the coating direction, and a second set of channels that are substantially perpendicular to the first set of channels.

The first set of channels comprises a plurality of parallel or substantially parallel channels, where the length of the first set of channels is greater than a length of the second set of channels.

The channel pattern of the dried chromonic layer on a flexible substrate (PET) was subsequently dry-etched, metallized and washed as described in Example 1.

An optical micrograph of FIG. 4 (500× magnification) shows a nanostructured pattern of a metal as a deposition material on a PET film comprising a first set of nanostructures aligned in a coating direction, and a second set of nanostructures substantially perpendicular to the first set of nanostructures. The first set of nanostructures comprises a plurality of parallel or substantially parallel nanostructures, where the length of the first nanostructures are greater than a length of the second set of nanostructures.

FIG. 4 shows an interconnected grid of metal wires or nanostructures. Surface resistance measurements were performed using a Delcom 717 non-contact eddy current conductance monitor from Delcom Instruments Inc. of Prescott Wis. on the metallized samples.

Region 1 and Region 2 of Example 2 were measured with the results shown in Table I.

TABLE I

| Sample | Surface Resistance (Ω/square) |
|---|---|
| SiAlOx - coated PET film without coating | >50,000 |
| Example 2 (region 1) | 555 |
| Example 2 (region 2) | 210 |

Table I shows that the development of a metallic grid (nanostructured pattern) on the electrically non-conductive SiAlOx-PET produced an electrically conductive substrate.

Optical transmission measurements were made on a Hewlett-Packard 8452A Spectrophotometer from Agilent Technologies of Santa Clara, Calif. The optical transmission measurements showed the presence of the nanostructured pattern resulted in a drop in transmissivity of approximately 13%, when compared to the original substrate (SiAlOx-coated PET film).

Example 3

A mixture comprising 0.26 grams of ICB 3000 corn starch from Tate & Lyle PLC of Decatur, Ill., 3.00 grams of deionized water, 0.14 grams of a 30 weight percent aqueous ammonium hydroxide solution from EMD Chemicals Inc. of Gibbstown, N.J.), and 1.0 gram of the dual functional surface modified colloidal silica dispersion of Preparatory Example 4 were added to a container with mechanical stirring. After the corn starch was dissolved in the mixture, 0.50 grams of the chromonic material of Formula III, 4-Dimethylamino-1-[4,6-di(4-carboxyphenylamino)-1,3,5-triazin-2-yl]pyridinium chloride), were slowly added to the mixture with stirring. Upon dissolution of the chromonic material, 0.13 grams of a 10 weight percent aqueous solution of an alkyl polyglucoside surfactant (Glucopon 425N) from Cognis Corporation of Cincinnati, Ohio, was added to the mixture with stirring. The resulting mixture was taken up by a disposable syringe fitted with a 1.2 micron disposable syringe filter having a 25 mm diameter (Versapore Membrane #4488, hydrophilic acrylic copolymer on a nonwoven support) from Pall Corporation of East Hills, N.Y., and filtered to form a coating composition.

The coating composition was coated onto a glass slide (Glayerbel Float) from Precision Glass and Optics of Santa Ana, Calif. using a Bird Bar applicator (Part #AR-5518) from Byk-Gardner of Columbia, Md., that had a 12.5 micrometer gap for forming a chromonic layer. The chromonic layer was allowed to air dry at room temperature (approximately 25° C.) for at least 5 minutes forming a dried chromonic layer.

The dried chromonic layer on the slide was exposed by submersing the slide in a narrow, glass chamber having dimensions of 0.7 cm×7.0 cm×7.7 cm. The glass chamber was filled with absolute ethanol (200-proof) from Aaper Alcohol & Chemical Co. of Shelbyville, Ky., for approximately 5 seconds to induce the formation of a channel pattern. The glass slide was then removed from the glass chamber and shaken to any remove residual ethanol. The sample was then placed in an oven set at 110° C. for approximately 15 seconds.

Analysis by optical microscopy showed the dried chromonic layer contained a channel pattern on the slide comprising a first set of channels and a second set of channels. Under the given conditions, the channel pattern comprises a first set of channels substantially aligned in the coating direction, and a second set of channels that are substantially perpendicular to the first set of channels. The first set of channels comprises a plurality of parallel or substantially parallel channels, where the length of the first set of channels is greater than a length of the second set of channels. Under the described conditions, the average length of the first set of channels before intersecting one of the second set of channels was approximately 45 microns; whereas, the second set of channels had a length of approximately 8 microns.

Various modifications and alterations of this disclosure will be apparent to those skilled in the art without departing from the scope and spirit of this disclosure, and it should be understood that this disclosure is not limited to the illustrative elements set forth herein.

What is claimed is:

1. A method comprising:
    applying a coating composition to a substrate surface in a coating direction to form a chromonic layer, the coating composition comprising a chromonic material, surface modified inorganic nanoparticles, and water;
    removing at least a portion of the water from the chromonic layer to form a dried chromonic layer; and
    exposing the dried chromonic layer to an hydrophilic organic solvent forming a channel pattern within the dried chromonic layer, the channel pattern comprising (a) a first set of channels in the coating direction and (b) a second set of channels that are substantially perpendicular to the first set of channels, wherein the first set of channels and the second set of channels have an average channel depth equal to an average thickness of the dried chromonic layer.

2. The method of claim 1, wherein the substrate comprises a flexible polymer film.

3. The method of claim 2, wherein the substrate surface further comprises a silicon aluminum oxide layer.

4. The method of claim 1, wherein the coating composition is a suspension of the surface modified inorganic nanoparticles in a homogeneous phase comprising the chromonic material, and water.

5. The method of claim 1, wherein a concentration of the surface modified inorganic nanoparticles in the coating composition is in a range of 10 to 30 weight percent based on a total weight of the coating composition.

6. The method of claim 1, wherein a pH of the coating composition is in a range of 5 to 12.

7. The method of claim 1, wherein the surface modified inorganic nanoparticles comprise silica, titania, zirconia, or combinations thereof.

8. The method of claim 1, wherein the surface modified inorganic nanoparticles are the reaction product of silica nanoparticles and an organosilane, where the organosilane is of the formula:

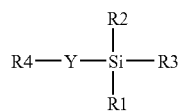

wherein
    R1, R2, and R3 independently comprise hydroxyl, alkoxy, halide, or combinations thereof;

Y comprises alkylene, arylene, oxyalkylene, or combinations thereof; and

R4 comprises carboxyl, halogen, alkoxy, —OPO$_3$H$_2$, —PO$_3$H$_2$, thiol, amino, anhydride, a salt, or combinations thereof.

9. The method of claim 8, wherein the organosilane is carboxyethyl silane triol sodium salt.

10. The method of claim 8, further comprising a second organosilane.

11. The method of claim 1, wherein the water removed from the coating composition is in a range of 5 to 95 weight percent based on a total weight of the coating composition.

12. The method of claim 1, wherein the dried chromonic layer has a thickness in a range of 500 nanometers to 3 microns.

13. The method of claim 1, wherein the hydrophilic organic solvent comprises an alcohol, a ketone, a nitrile, an ether, or combinations thereof.

14. The method of claim 1, wherein the hydrophilic organic solvent is anhydrous.

15. The method of claim 1, wherein the hydrophilic organic solvent does not dissolve the chromonic material.

16. The method of claim 1, wherein the first set of channels and the second set of channels independently have an average channel width in a range of 10 to 800 nanometers.

17. The method of claim 1, wherein the first set of channel and the second set of channels independently have an average channel depth in a range of 500 nanometers to 3 microns, an average channel width in a range of 10 to 800 nanometers, and an average period in a range of 500 nanometers to 1 micron.

18. The method of claim 1, wherein the first set of channels comprises a plurality of parallel or substantially parallel channels in the coating direction.

19. The method of claim 1, wherein a length of the first set of channels in a coating direction is greater than a length of the second set of channels substantially perpendicular to the first set of channels.

20. A method comprising:
applying a coating composition to a substrate surface in a coating direction to form a chromonic layer, the coating composition comprising chromonic material, surface modified inorganic nanoparticles, and water;
removing at least a portion of the water from the chromonic layer to form a dried chromonic layer;
exposing the dried chromonic layer to an hydrophilic organic solvent forming a channel pattern within the dried chromonic layer, the channel pattern comprising (a) a first set of channels in the coating direction and (b) a second set of channels that are substantially perpendicular to the first set of channels, wherein the first set of channels and the second set of channels have an average channel depth equal to an average thickness of the dried chromonic layer;
disposing a metal containing material on a surface of the dried chromonic layer, and within both the first set of channels and the second set of channels, the metal containing material within the first set of channels and the second set of channels contacting the substrate surface; and
forming a nanostructured pattern on the substrate, the forming comprising removing both the dried chromonic layer and the metal containing material disposed on the surface of the dried chromonic layer, wherein the metal containing material disposed within the first set of channels and the second set of channels adheres to the substrate.

21. The method of claim 20, wherein the nanostructured pattern comprises (a) a first set of nanostructures and (b) a second set of nanostructures substantially perpendicular to the first set of nanostructures.

22. An article formed by the method of claim 1, wherein the chromonic material is of the formula:

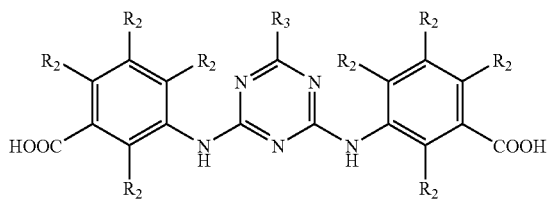

wherein
R2 comprises hydrogen, a substituted or an unsubstituted alkyl, a substituted or an unsubstituted alkoxy, a substituted or an unsubstituted carboxyl alkyl, or combinations thereof; and
R3 comprises a substituted or an unsubstituted heteroaromatic ring, a substituted or an unsubstituted heterocyclic ring, or combinations thereof.

23. An article formed by the method of claim 1, wherein the chromonic material is of the formula:

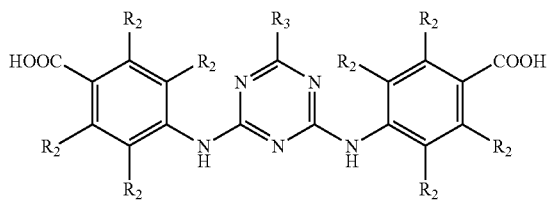

wherein
R2 comprises hydrogen, a substituted or an unsubstituted alkyl, a substituted or an unsubstituted alkoxy, a substituted or an unsubstituted carboxyl alkyl, or combinations thereof; and
R3 comprises a substituted or an unsubstituted heteroaromatic ring, a substituted or an unsubstituted heterocyclic ring, or combinations thereof.

24. An article comprising:
a substrate having a substrate surface; and
a dried chromonic layer disposed on the substrate surface, the dried chromonic layer comprising a chromonic material, and surface modified inorganic nanoparticles, the dried chromonic layer having a channel pattern comprising
a first set of channels; and
a second set of channels that is substantially perpendicular to the first set of channels, wherein the first set of channels and the second set of channels have an average channel depth equal to an average thickness of the dried chromonic layer.

25. The article of claim 24, further comprising a metal containing material disposed on a surface of the dried chromonic layer, and within both the first set of channels and the second set of channels, wherein the metal containing material within both the first set of channels and the second set of channels contacts the substrate surface.

* * * * *

UNITED STATES PATENT AND TRADEMARK OFFICE
CERTIFICATE OF CORRECTION

PATENT NO. : 7,718,219 B2  
APPLICATION NO. : 11/769013  
DATED : May 18, 2010  
INVENTOR(S) : Wayne S Mahoney Page 1 of 1

It is certified that error appears in the above-identified patent and that said Letters Patent is hereby corrected as shown below:

Title Page 2 Item (56) (Other Publications)
Line 9; delete "Colum" and insert -- Column --, therefor.
Line 21; delete "Nanolithogrphy" and insert -- Nanolithography --, therefor.
Line 24; delete "Lightography,"" and insert -- Lithography," --, therefor.

Column 4
Line 25-26; delete "hexaaryltryphenylene." and insert -- hexaaryltriphenylene. --, therefor.

Column 9
Line 7; delete "(Amey" and insert -- (Arney --, therefor.
Line 39; delete "chomonic" and insert -- chromonic --, therefor.

Column 11
Line 50; delete "steric" and insert -- stearic --, therefor.

Column 22
Line 40; delete "(Glayerbel" and insert -- (Glaverbel --, therefor.

Column 23
Line 10; delete "O2" and insert -- $O_2$ --, therefor.

Column 25
Line 51; delete "(Glayerbel" and insert -- (Glaverbel --, therefor.

Column 28
Line 19; Claim 22, delete "R2" and insert -- $R_2$ --, therefor.
Line 23; Claim 22, delete "R3" and insert -- $R_3$ --, therefor.
Line 39; Claim 23, delete "R2" and insert -- $R_2$ --, therefor.
Line 43; Claim 23, delete "R3" and insert -- $R_3$ --, therefor.

Signed and Sealed this  
Twelfth Day of April, 2011

David J. Kappos  
*Director of the United States Patent and Trademark Office*